United States Patent
Liao

(10) Patent No.: US 6,715,291 B1
(45) Date of Patent: Apr. 6, 2004

(54) PARALLEL MIXED POWER UNIT

(75) Inventor: Gordon Liao, Tainan Hsien (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 0 days.

(21) Appl. No.: 10/372,404

(22) Filed: Feb. 25, 2003

(51) Int. Cl.[7] .......................... B60L 11/00; B60K 1/02; F02B 73/00

(52) U.S. Cl. ............................. 60/698; 60/713; 60/716; 60/718; 180/65.2; 180/65.4; 180/65.6; 475/5; 477/3

(58) Field of Search .......................... 60/698, 713, 716, 60/718; 180/65.2, 65.3, 65.4, 65.6; 477/3; 475/5

(56) References Cited

U.S. PATENT DOCUMENTS 5,513,719 A * 5/1996 Moroto et al. ............. 180/65.6
6,425,839 B1 * 7/2002 Koelle et al. ................. 475/5
6,492,742 B1 * 12/2002 Fujikawa et al. .............. 475/5

* cited by examiner

*Primary Examiner*—Sheldon J. Richter
(74) *Attorney, Agent, or Firm*—Bacon & Thomas, PLLC

(57) ABSTRACT

A parallel mixed power unit includes a storage battery, an electron controlling module, an internal combustion engine with an output shaft, a planetary gear differential device having a shell, at least one planetary gear unit having two planetary gears provided inside the planetary gear differential device and disposed on a planetary arm by a bearing, with the planetary arm fixed on the shell, a solar gear meshed with one of the two planetary gears and fixed with the output shaft of the internal combustion engine, and another solar gear meshed with the other of the two planetary gears and fixed with a transmission shaft. The transmission shaft has one end connected with the output shaft of an electric motor by a rotary transmission device and the other end connected with the output shaft of a load terminal by another rotary transmission device. The electron-controlling module chooses a suitable operating mode and controls the operating opportune moment of the internal combustion engine, the generator, the electric motor and the storage battery.

15 Claims, 18 Drawing Sheets

PARALLEL MIXED POWER UNIT

BACKGROUND OF THE INVENTION

This invention relates to a parallel mixed power unit, particularly to one provided with a planetary gear differential device combined with an internal combustion engine, a generator, and an electric motor with an output shaft, a storage battery and an electron-controlling module. The electron-controlling module chooses a suitable operating mode to control an operating opportune moment of the internal combustion engine, the generator, the electric motor and the storage battery to reach a purpose of energy management. The electron-controlling module also adjusts the rotating speed of the generator and the electric motor to let the internal combustion engine maintain a constant rotating speed during operating, achieving effect of non-staged and non-uniform velocity.

Generally, a so-called mixed power transmission unit is composed of an internal combustion engine as a power system supplying power by burning oil, and an electric motor and a generator as a power unit driven by electricity. Whether to utilize burning oil or electric system as a power source all depends on the demands of the power unit to let the power system reach a perfect condition. The forms of the mixed power unit are classified into a series mixed power unit and a parallel mixed power unit.

The series mixed power unit is to have an internal combustion engine directly driving a generator to generate electricity to supply one or more than one electric motor with power, and have one or more than one storage battery storing surplus electric power, having ideal power flow. However, the internal combustion engine is unable to drive an output shaft with the electric motor at the same time, therefore the torsion and rotating speed of the system output are completely decided by the electric motor. In this case, should the electric motor fail to bear a load, the internal combustion engine cannot be of any assistance.

The parallel mixed power unit is composed of an internal combustion engine, an electric motor and a generator. Different from the series mixed power unit, the parallel mixed power unit can either have the electric motor outputting power independently, or have the internal combustion engine and the electric motor outputting power combined together. Besides, the internal combustion engine is able to have part of its output kinetic energy driving the generator to generate electricity and the rest of the kinetic energy directly outputting to deal with an external load, while the generator supplies the electric motor with power to operate or supplies the storage battery with electric power to be stored therein, having better effect than the series mixed power unit.

A conventional parallel mixed power unit 1 with a double planetary gear 1, as shown in FIG. 1, includes a storage battery 2, an electron controlling module 3, an internal combustion engine 4, a fly wheel 5 provided thereon with a brake 51, a generator 6, an electric motor 7, a double planetary gear device 8 consisting of two planetary gear units 81, 82, two planetary gear bases 83, 84, two solar gears 85, 86, a common gear circle 87 provided therein with two inner gear circles 871, 872, an output shaft 9 and two belt units 10, 11.

The double planetary gear device 8 is connected with the internal combustion engine 4, the generator 6, the electric motor 7 and the output shaft 9. In case the kinetic energy output by the internal combustion engine 4 is insufficient to drive a load, the electric motor 7 has to be started to output power together with the internal combustion engine 4. On the contrary, in case the kinetic energy output by the internal combustion engine 4 is larger than the load, the surplus energy is charged for storing by the generator 6. Besides, according to the conventional parallel mixed power unit, the electric motor 7 can output power independently under the condition of not starting the internal combustion engine 4. Although the conventional parallel mixed power unit has a function of energy management, yet its whole systematic structure must rely on making use of the two planetary gear units 81, 82 and the two inner gear circles 871, 872, thus increasing much inner friction and causing damage to the components inside and also increasing difficulty in producing.

SUMMARY OF THE INVENTION

The objective of the invention is to offer a parallel mixed power unit having no inner gear circles provided in the interior to reduce inner friction and damage, simplifying the whole structure of the power unit and able to be directly installed in the rotor of a generator to save space.

The parallel mixed power unit in the present invention includes a storage battery, an electron controlling module and an internal combustion engine having its output shaft provided thereon with a flywheel. A planetary gear differential device has a shell able to be rotated by the rotor of a generator and at least one planetary gear unit provided inside and the planetary gear unit has two coaxial planetary gears installed on a planetary arm by a bearing, with the planetary arm fixed on the shell of the planetary gear differential device. A first solar gear is meshed with one of the two planetary gears and fixed with the output shaft of the internal combustion engine. A second solar gear is meshed with the other one of two planetary gears and fixed with a transmission shaft. The transmission shaft has one end connected with the output shaft of an electric motor by a rotary transmission device and the other end connected with the output shaft of a load terminal by another rotary transmission device. The electron-controlling module chooses a suitable operating mode and controls the operating opportune moment of the internal combustion engine, the generator, the electric motor and the storage battery, achieving effects of energy management and rotating speed control.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
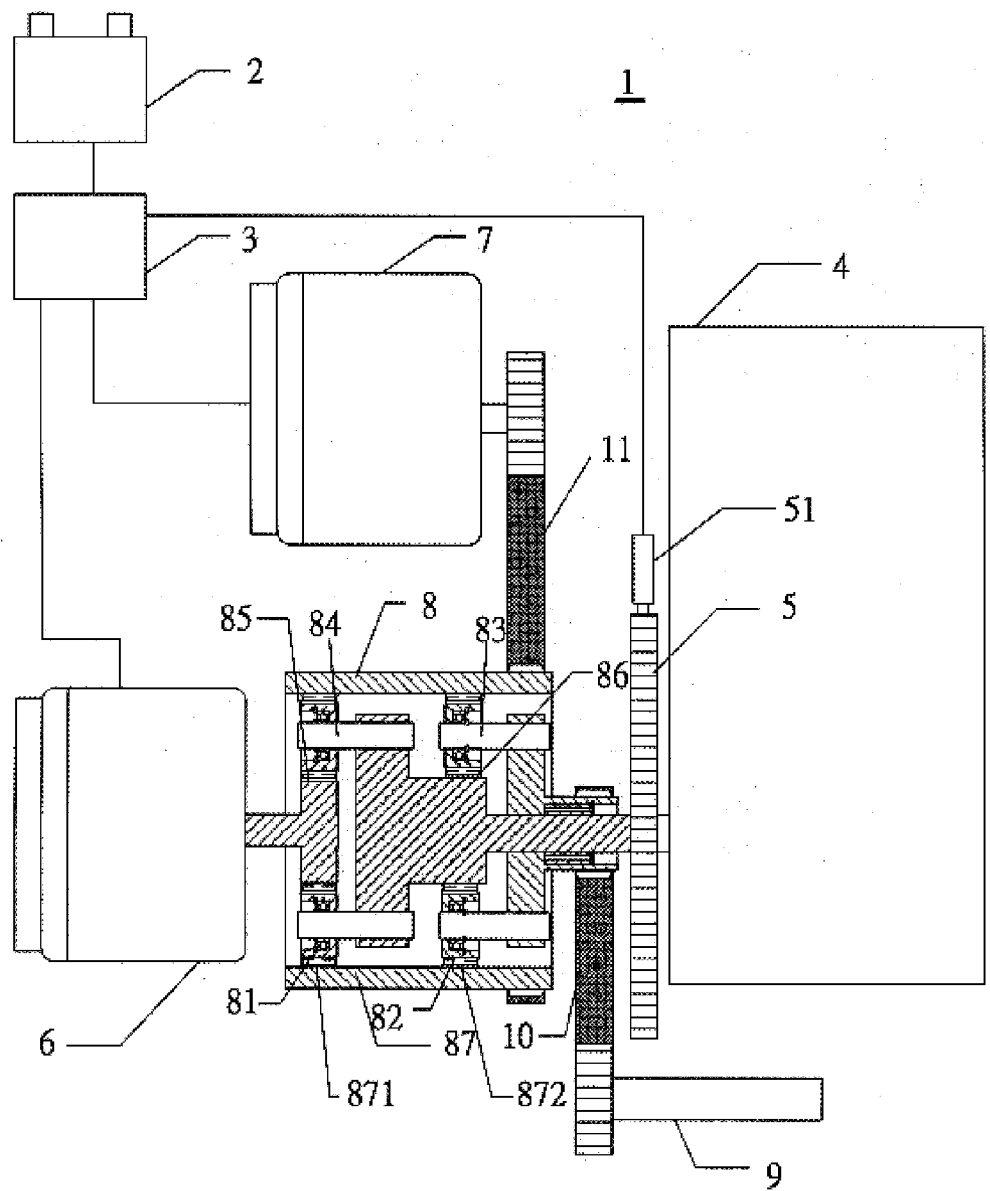
FIG. 1 is a cross-sectional view of a conventional parallel mixed power unit with a double planetary gear.
Figure 2:
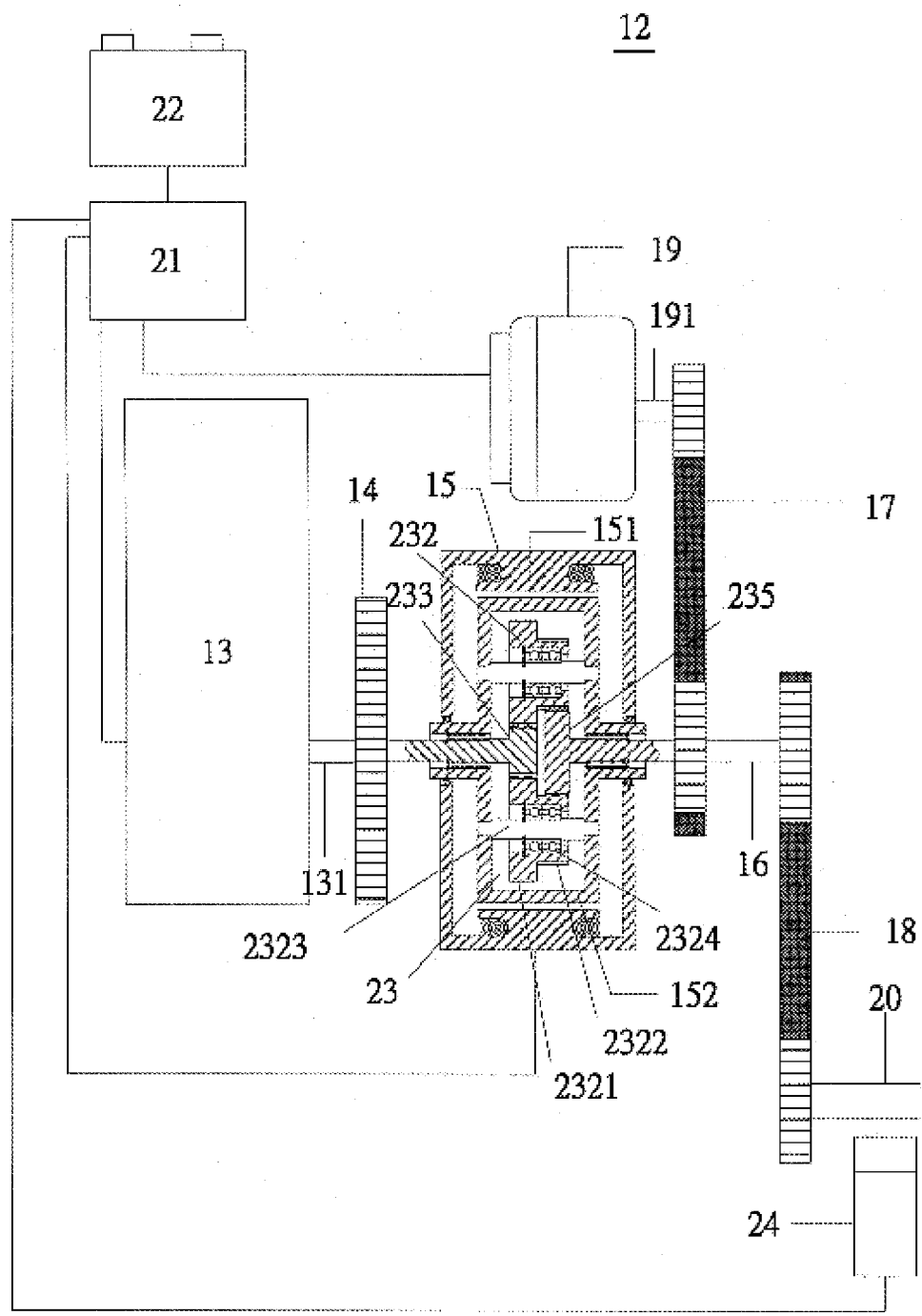
FIG. 2 is a cross-sectional view of a parallel mixed power unit in the present invention.

A preferred embodiment of a parallel mixed power unit 12 in the present invention, as shown in FIG. 2, includes an internal combustion engine 13, a flywheel 14, a generator 15, a transmission shaft 16, a first rotary transmission device 17, a second rotary transmission device 18, an electric motor 19, an output shaft 20, an electron controlling module 21, a storage battery 22, a planetary gear differential device 23 and a brake 24 as main components combined together.

The transmission shaft 16, as shown in FIG. 2, has one end connected with the output shaft 191 of the electric motor 19 by the first rotary transmission device 17 made of a gear, a belt or a chain, and the other end connected with the output shaft 20 by the second rotary transmission device 18 made of a gear, a belt or a chain, with a brake 24 disposed on the output shaft. The electron-controlling module 21 chooses a suitable operating mode and controls an action opportune moment of the internal combustion engine 13, the generator 15, the electric motor 19 and the storage battery 22 to reach a purpose of energy management.

Figure 3:
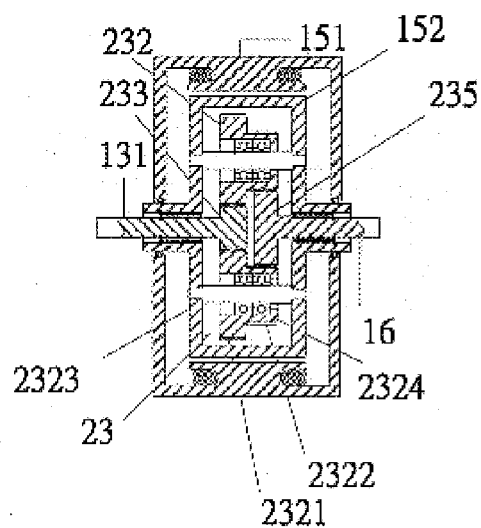
FIG. 3 is a cross-sectional view of the generator of the parallel mixed power unit in the present invention.

The generator 151, as shown in FIG. 3, is provided with a stator 151, a rotor 152 positioned at the inner side of the stator 151 and a planetary gear differential device 23 at the inner side of the rotor 152.

Figure 4:
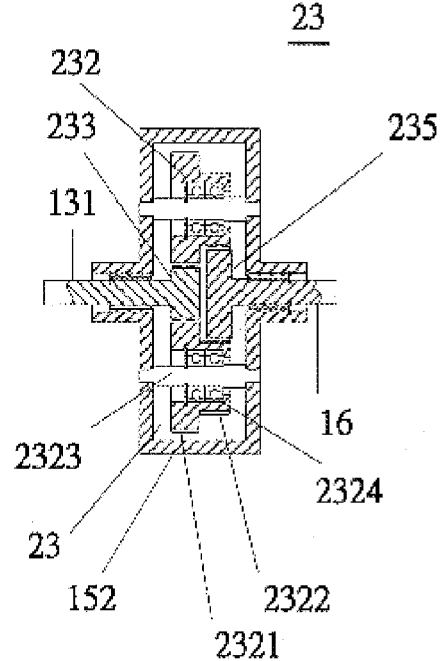
FIG. 4 is a cross-sectional view of the planetary gear differential device of the parallel mixed power unit in the present invention.

The planetary gear differential device 23, as shown in FIG. 4 is provided with at least one planetary gear unit 232 consisting of a first planetary gear 2321 and a second planetary gear 2323 positioned coaxially on a bearing 2324 installed on a planetary arm 2323 for rotating together. The planetary arm 2323 has opposite ends fixed on the rotor 152 of the generator 15 positioned corresponding to the planetary gear differential device 23, that is, the rot or 152 of the generator 15 can be regarded as the shell of the planetary gear differential device 23. A first solar gear 233 is meshed with the first planetary gear 2321 and fixed with the output shaft 131 of the internal combustion engine 13, as shown in FIG. 2. A second solar gear 235 is meshed with the second planetary gear 2322 and fixed with the transmission shaft 16, as shown in FIG. 2.

By so designing, when the rotor 152 of the generator keeps motionless, as shown in FIG. 4, and the output shaft 131 of the internal combustion engine 13 rotates, 15 the output shaft 131 will actuate the first solar gear 233 to rotate together with the first and the second planetary gear 2321, 2322. Simultaneously, the second planetary gear 2322 meshed with the second solar gear 235 will actuate the second solar gear 235 to rotate together with the transmission shaft 16. At t his time, if the output shaft 131 of the internal combustion engine 13 rotates at a constant speed, the transmission shaft 16 of the planetary gear differential device 23 will also rotate constantly In another case, if the rotor 152 of the generator 15 rotates and when the output shaft 131 of the internal combustion engine 13 rotates together with the first solar gear 233 and the two planetary gears 2321, 2322 at a constant speed, although the second planetary gear 2322 can actuate the second solar gear 235 to rotate together with the transmission shaft 16, yet rotating speed of the transmission shaft 16 will change due to rotation of the rotor 152 of the generator 15, because the rotor 152 of the generator 15 is fixedly combined with the planetary arm 2323, and the first and the second planetary gear 2321, 2322 are connected with the planetary arm 2323 by the bearing 2324. For instance, in case the output shaft 131 of the internal combustion engine 13 rotates at a constant speed and the rotor 152 of the generator 15 rotates in the same direction as that of the output shaft 131 of the internal combustion engine 13, the transmission shaft 16 will rotate increasingly fast when the rotating speed of the rotor 152 of the generator increases, but the transmission shaft 16 will rotate slowly when the rotating speed of the rotor 152 of the generator 15 decreases.

Evidently, as shown in FIG. 2, after the internal combustion engine 13 is started, its output shaft 131 will rotate together with the first solar gear 233, the first planetary gear 2321, the second planetary gear 2322, the second solar gear 235 and the transmission shaft 16. In other words, in case only the internal combustion engine 13 is started singly, the rotating speed of its output shaft 131 is equal to that o f the transmission shaft 16. But when both the generator 15 and the electric motor 19 are started, the rotating speed of the transmission shaft 16 will change. FIG. 2 shows clearly that the rotor 152 of the generator 15 regarded as the shell of the planetary gear differential device 23 is fixed with the planetary arm 2323 of the planetary gear differential device 23, therefore once the rotor 152 of the generator 15 rotates, the transmission shaft 16 will be influenced in rotation. Further, the transmission shaft 16 is connected with the output shaft 20 located below and with the electric motor 19 positioned above respectively by means of the rotary transmission device 18 and 17, therefore the two rotary transmission devices 17, 18 will certainly influence the rotating speed of the transmission shaft 16. Specifically, the rotating speed of the internal combustion engine 13 of this power unit can be fixed constant, and the rotating speed of the output shaft 20 can be controlled by adjusting the rotating speed of the generator 15 and the electric motor 19, thus reaching a purpose of controlling rotating speed.

Besides being able to control the rotating speed of the generator 15 and the electric motor 19, this invention is also provided with the electron controlling module 21 for choosing a suitable operating mode to let the generator 15 or the electric motor 19 serve as a power output source to convert electric power into kinetic energy, or serve as an power storing device to convert kinetic energy into electric power to be stored. Therefore, the power unit of this invention is able to control the operating mode of the generator 15 and the electric motor 19 according to the demands of an external load and match with the operating opportune moment of the internal combustion engine 13 to reach a purpose of energy management.

As can be understood from the above description, the parallel mixed power unit 12 of this invention is able to control the operating mode and the operating opportune moment of the generator 15, the electric motor 19 and the internal combustion engine 13 by the electron controlling module 21, and based on this design, seven operating modes can be developed, including a completely electrically operating mode, an internal combustion engine starting mode, a double-charging mode, a single-charging mode, a no-storage mode, a static charging mode and a brake speed-reducing charging mode, as shown in FIGS. 5–10 (with the arrow therein representing a power flow transmitting direction: arrow A representing a transmitting direction of electric power, arrow B representing a transmitting direction of kinetic energy and arrow C representing loss of kinetic energy.) These operating modes are described below.

Figure 5:
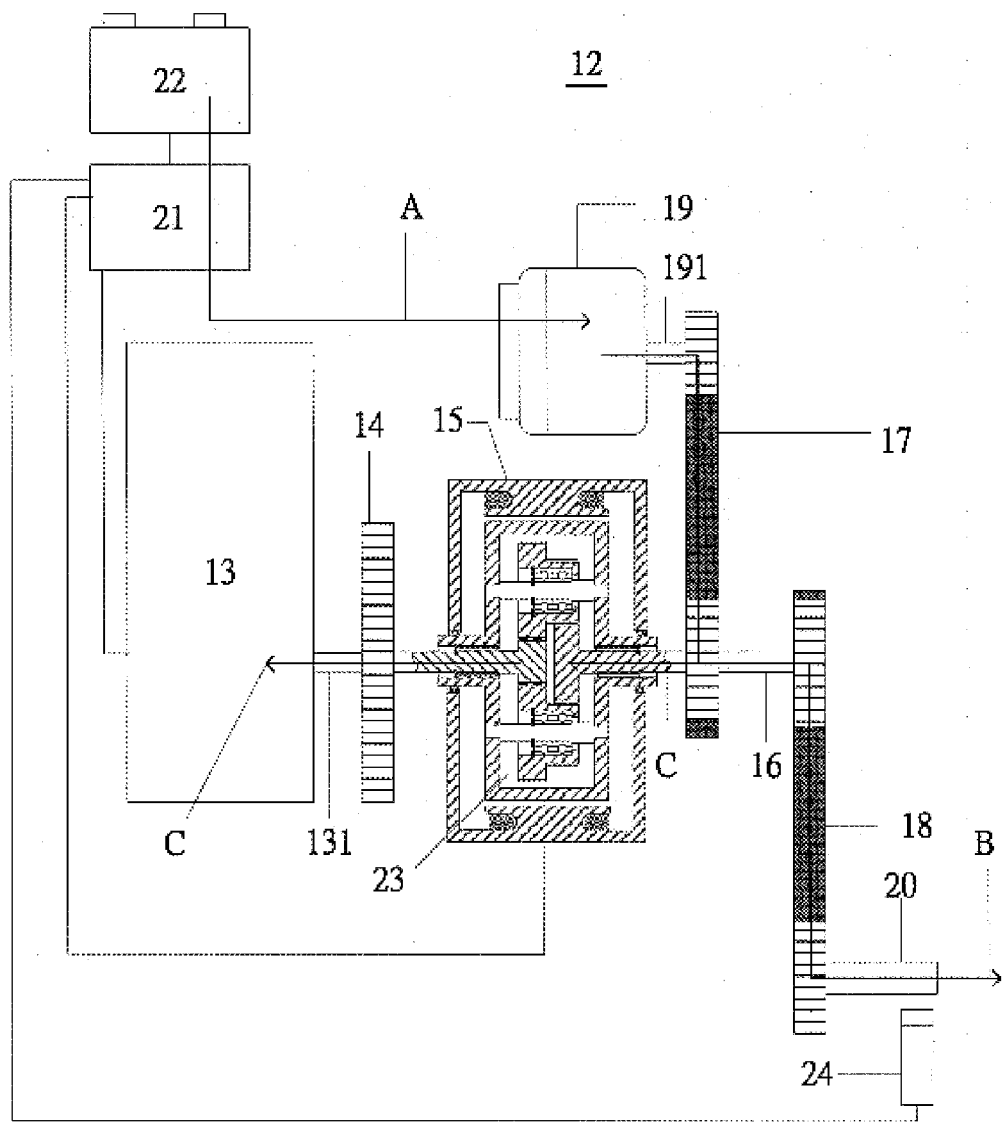
FIG. 5 is a cross-sectional view of the parallel mixed power unit in the present invention, indicating a power flow transmitting direction.
Figure 6:
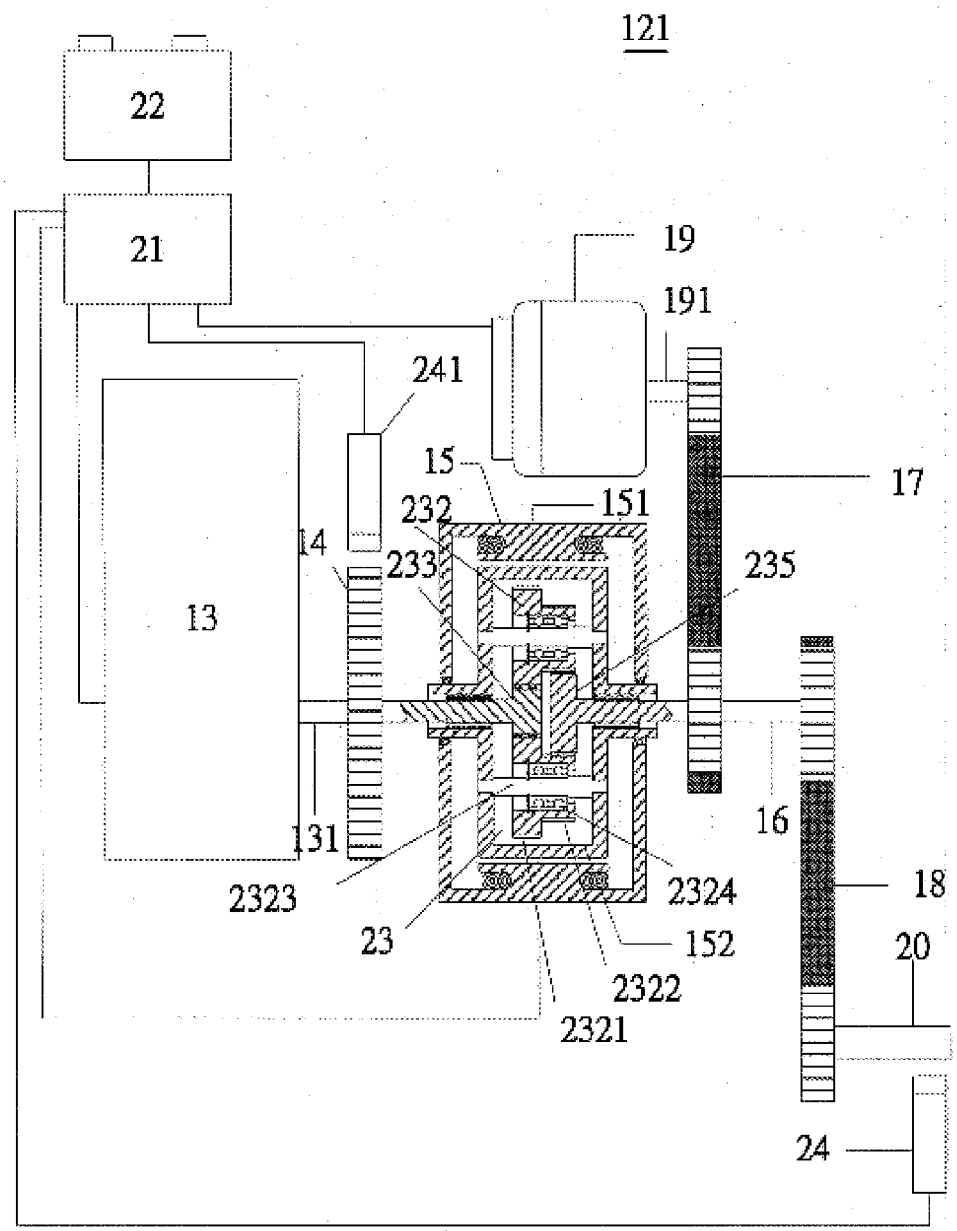
FIG. 6 is a cross-sectional view of a first developed parallel mixed power unit in the present invention.
Figure 7:
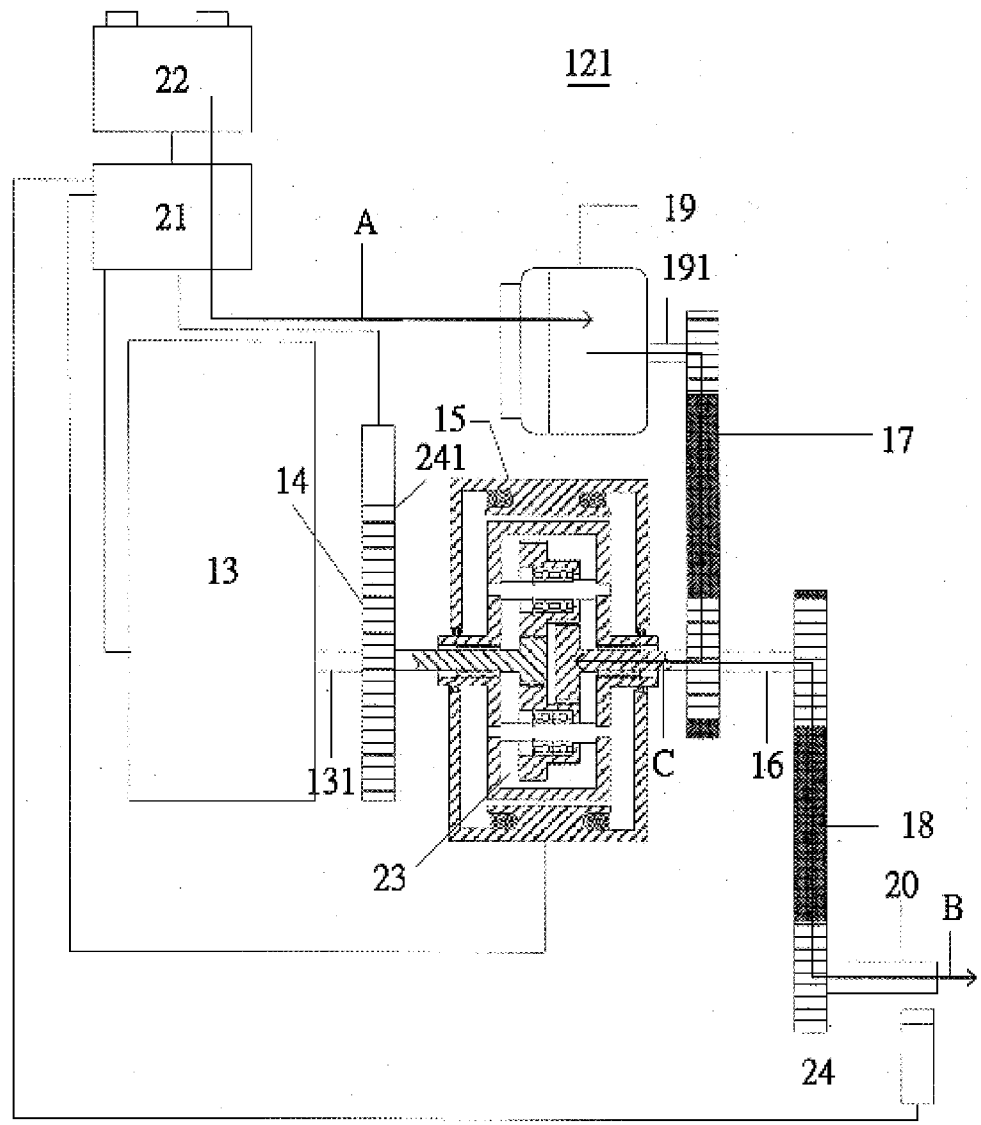
FIG. 7 is a cross-sectional view of the first developed parallel mixed power unit in the present invention, indicating a power flow transmitting direction when it is operated completely by electricity.

1. The completely electrically operating mode, as shown in FIG. 5, is applicable to a condition that the parallel mixed power unit 12 of the invention is started from a motionless state or the storage battery 22 is fully charged. At this time, the internal combustion engine 13 isn't started and the generator 15 does not get a load, therefore the electric motor 19 serves as a power source to output kinetic energy to let the transmission shaft 16 rotate together with the output shaft 20 through the rotary transmission device 18 to balance an external load. In the meantime, the transmission shaft 16 also actuates the planetary gear differential device 23 to rotate and make the internal combustion engine 13 and the rotor 152 of the generator 15 rotate idly, thus resulting in only a little loss of energy. To prevent the internal combustion engine 13 from being worn off due to rotating idly under such an operating mode, the flywheel 14 can be installed on the output shaft 131 of the internal combustion engine 13 and a brake 241 can be provided on the flywheel 14 to make up a first developed parallel mixed power unit 121, as shown in FIG. 6.

The first developed parallel mixed power unit 121 has the same function and operating mode as those of the parallel mixed power unit 12 shown in FIG. 2. The difference between them is that during completely electric operation, the first developed parallel mixed power unit 121 is able to control the brake 241 to stop the flywheel 14 from rotating and the internal combustion engine 13 from rotating idly and being worn off by means of the electron controlling module 21. Nevertheless, the brake 241 is only able to control the flywheel 14 of the internal combustion engine 13 but impossible to stop the generator 15 from rotating idly, so a little loss of energy of the generator 15 is inevitable, with the power flow transmission under such a condition shown in FIG. 7.

Figure 8:
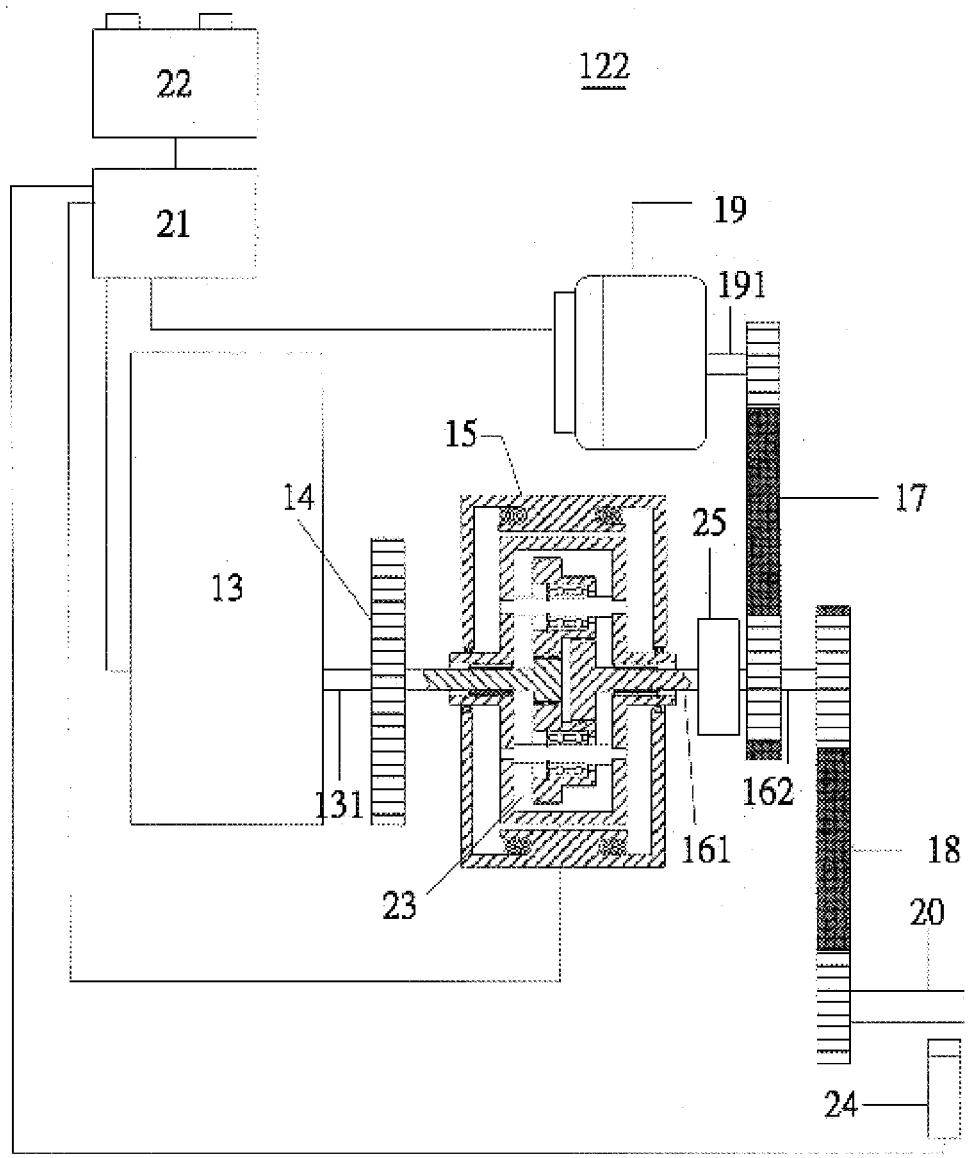
FIG. 8 is a cross-sectional view of a second developed parallel mixed power unit in the present invention.
Figure 9:
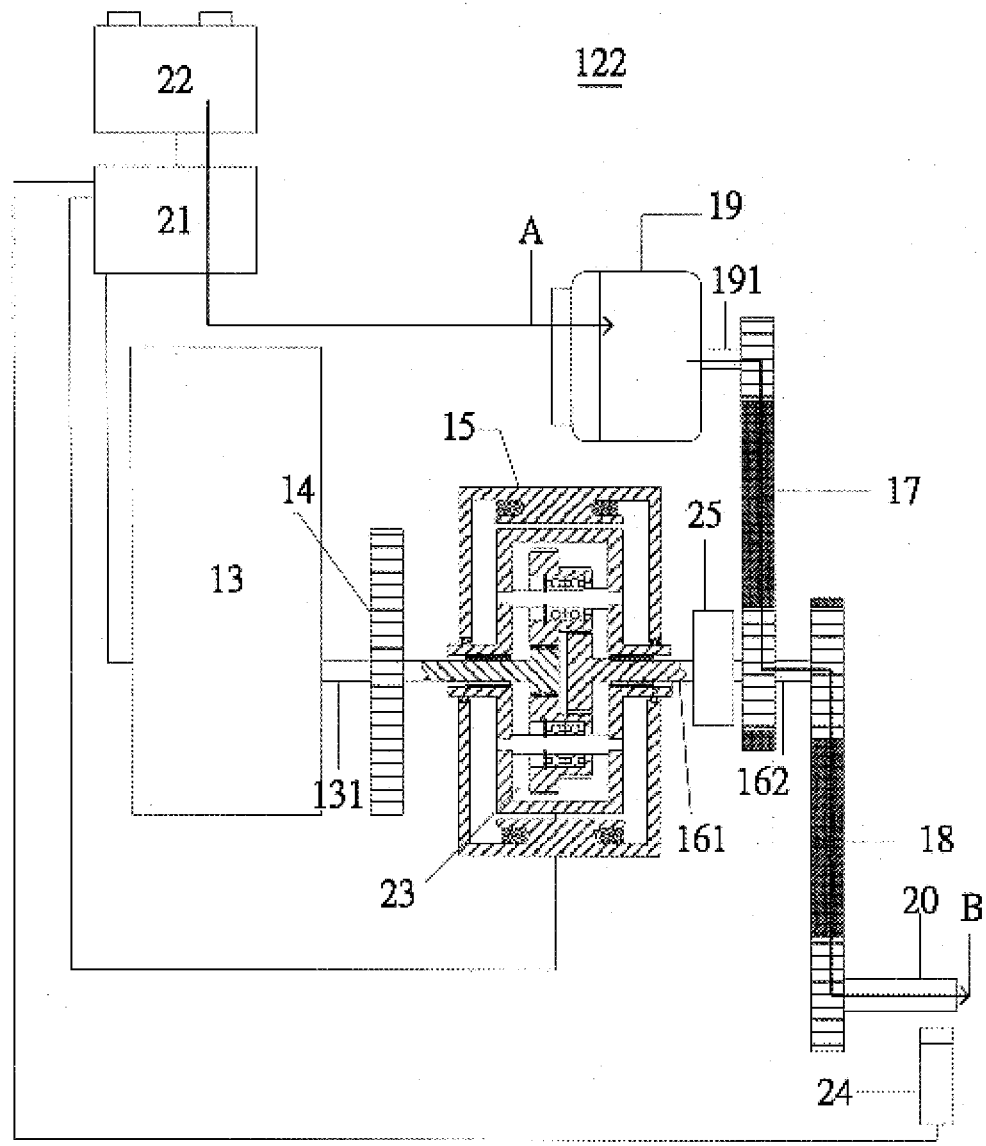
FIG. 9 is a cross-sectional view of the second developed parallel mixed power unit in the present invention, indicating a power flow transmitting direction when it is operated completely by electricity.

To prevent both the generator 15 and the internal combustion engine 13 from rotating idly at the same time, a clutch 25 can be provided on the transmission shaft 16 between the outer side of the planetary gear differential device 23 and the rotary transmission device 17 to divide the transmission shaft 16 into a clutch section 161 and a non-clutch section 162, thus making up a second developed parallel mixed power unit 122, as shown in FIG. 8. If the clutch 25 is connected with the transmission shaft 16, this second developed parallel mixed power unit 122 has the same function and operating mode as those of the parallel mixed power unit 12. The difference between them is that during completely electric operating, the second developed parallel mixed power unit 122 is able to separate the clutch section 161 from the non-clutch section 162 of the transmission shaft 16 by means of the clutch 25 to let the kinetic energy output by the electric motor 19 completely transmitted to the output shaft 20. Thus, the clutch section 161 of the transmission shaft 16 is not used, impossible to actuate the generator 15 and the internal combustion engine 13 to rotate idly and lose energy, with the power flow transmission of this condition shown in FIG. 9.

Figure 10:
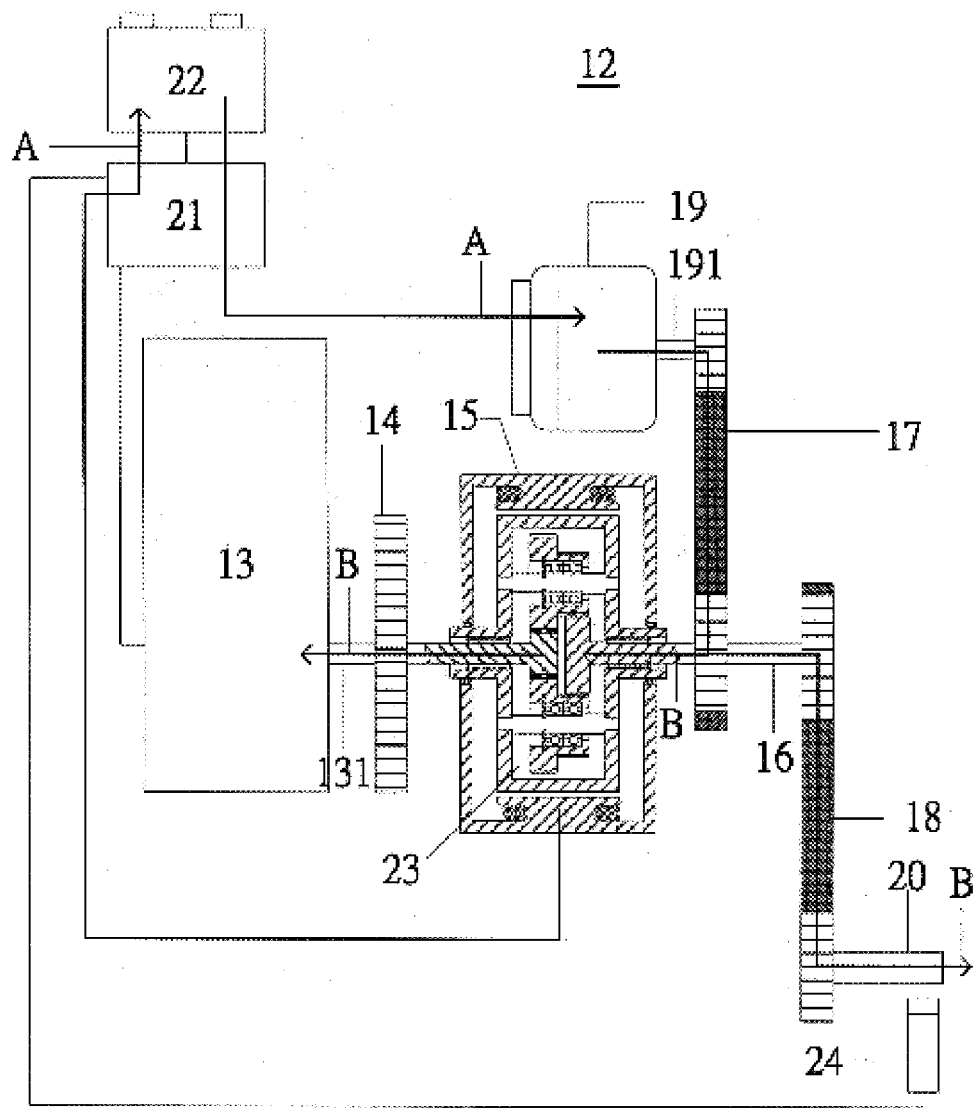
FIG. 10 is a cross-section view of the parallel mixed unit in the present invention, indicating a power flow transmitting direction when the internal combustion engine is started.

2. The internal combustion engine-starting mode, as shown in FIG. 10, is applicable to a condition that the storage battery 22 needs to be charged anew, or the kinetic energy output by the electric motor 19 is insufficient. Under this condition, the electric motor 19 and the generator 15 start the internal combustion engine 13. At this time, the electric motor 19 serves as a power source to output kinetic energy and actuate the transmission shaft 16 to rotate together with the output shaft 20 and the planetary gear differential device 23. Simultaneously the electron controlling module 21 controls the generator 15 connected with the planetary gear differential device 23 to get a load and produce a reaction to start the internal combustion engine 13.

Figure 11:
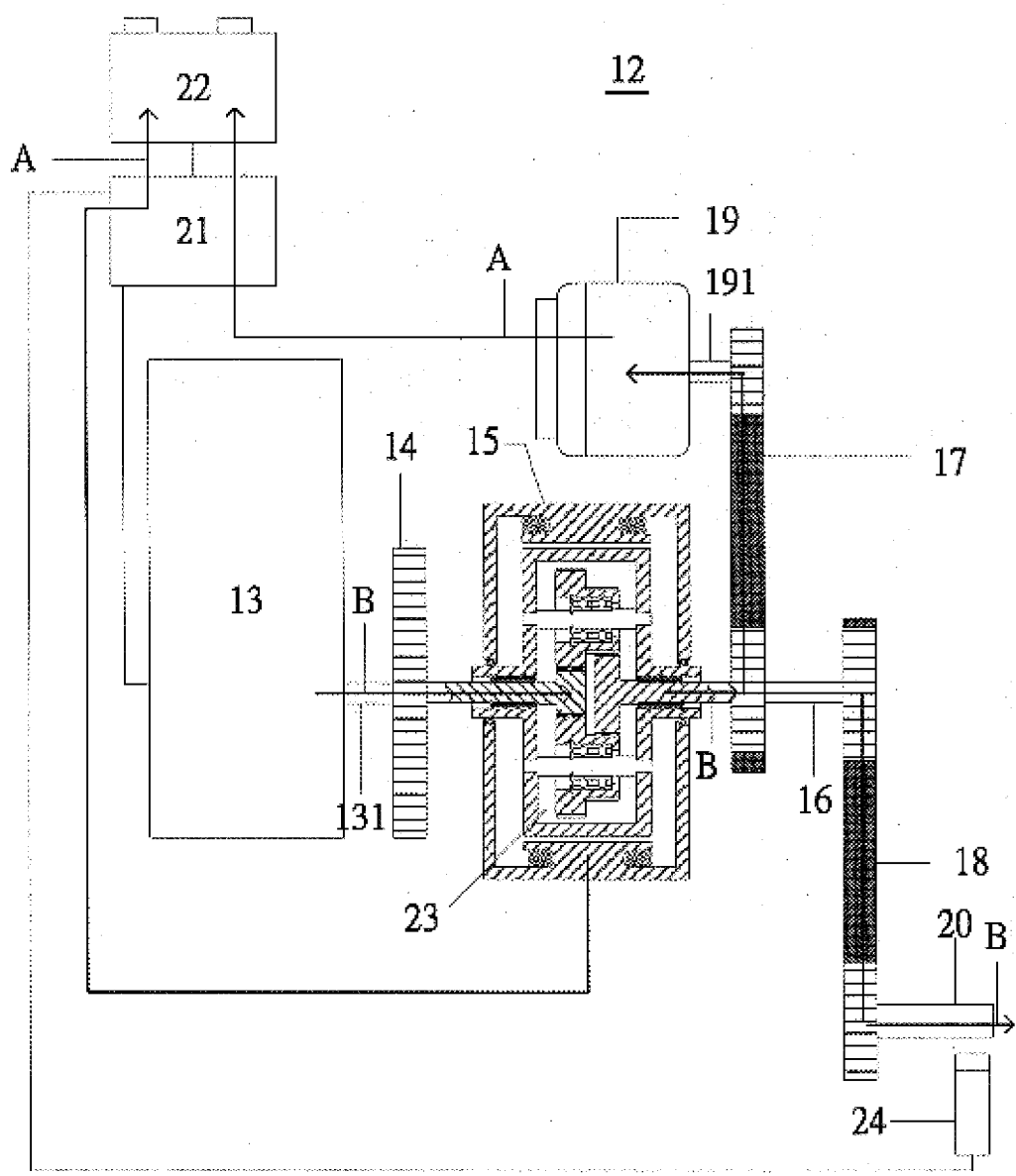
FIG. 11 is a cross-sectional view of the parallel mixed power unit in the present invention, indicating a power flow transmitting direction when it is operated under a double charging mode.

3. The double charging mode, as shown in FIG. 11, is applicable to a condition that the storage battery 22 is being charged and that after the internal combustion engine 13 outputs kinetic energy to deal with an external load and supply the generator 15 with kinetic energy to be converted into electric power for storing, there is still surplus kinetic energy. At this time, the electron controlling module 21 controls the electric motor 19 to convert the surplus kinetic energy into electric power to be stored therein.

Figure 12:
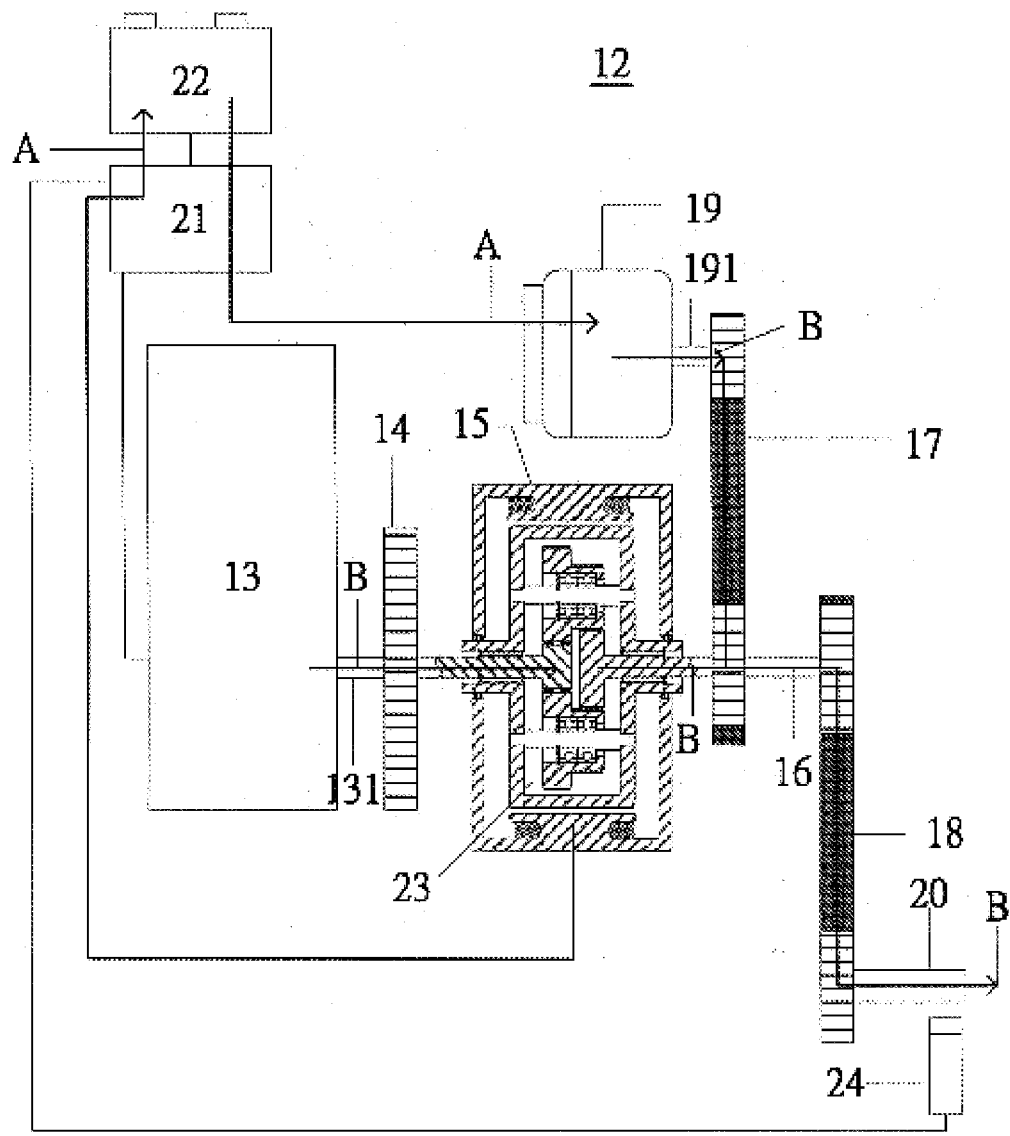
FIG. 12 is cross-sectional view of the parallel mixed power unit in the present invention, indicating a power flow transmitting direction when it is operated under a single charging mode.

4. The single charging mode, as shown in FIG. 12, is applicable to a condition that the storage battery 22 still has some electric power stored inside, and the kinetic energy output by the internal combustion engine 13 is supplied to the generator 15 and converted into electric power, but this electric power is insufficient to deal with an external load. At this time, the electron controlling module 21 controls the storage battery 22 to supply the electric motor 19 with electric power, letting the electric motor 19 serve as a power source and convert the electric power into kinetic energy to make amends for the insufficient kinetic energy.

Figure 13:
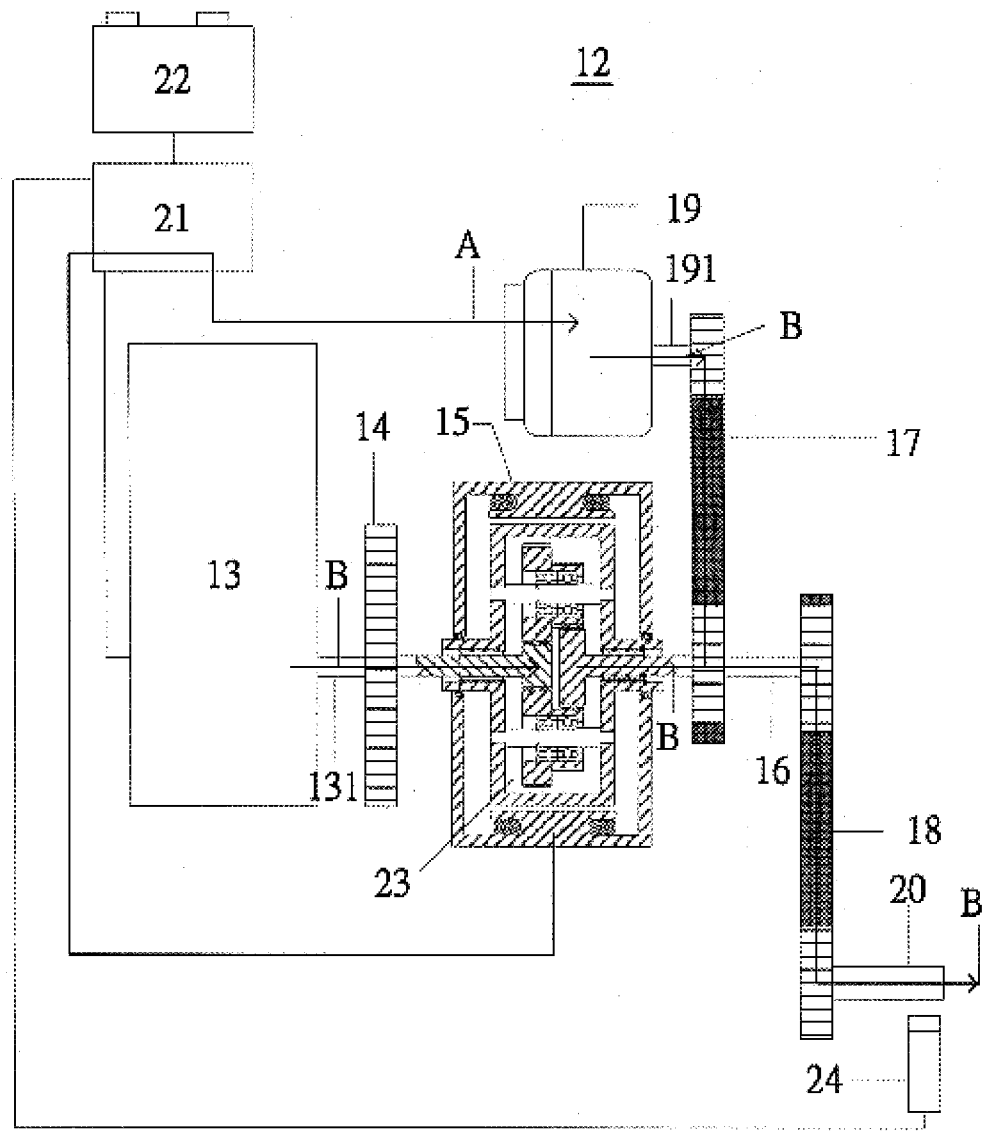
FIG. 13 is a cross-sectional view of the parallel mixed power unit in the present invention, indicating a power flow transmitting direction when it is operated under a no-storage mode.

5. The no-storage mode, as shown in FIG. 13, is applicable to a condition that the parallel mixed power unit 12 outputs energy to the maximum and that the electric power in the storage battery 22 is used up or cannot be charged. At this time, the electric power converted by the generator 15 is not to be stored in the storage battery 22 but directly supplied for the electric motor 19 to let the electric motor 19 serve as another power source.

Figure 14:
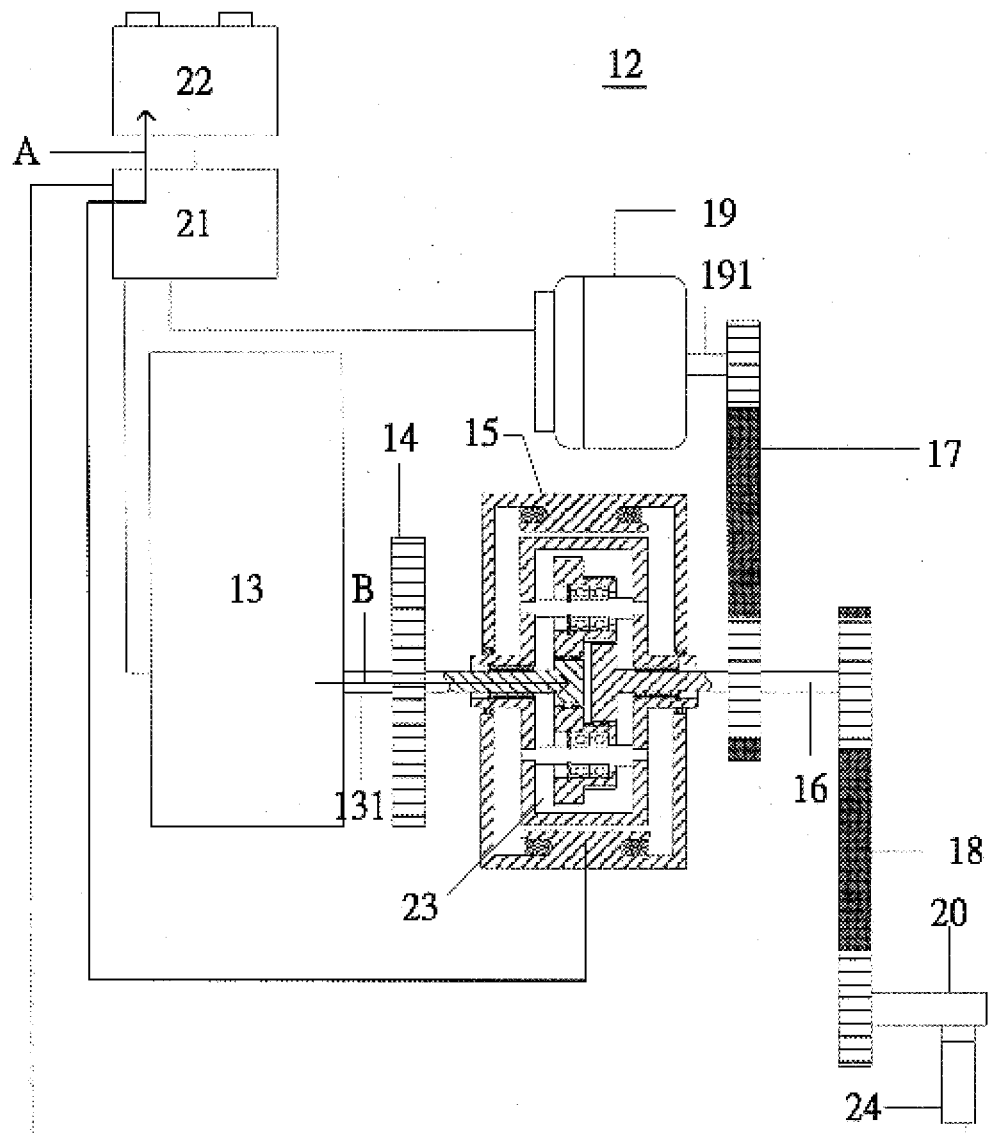
FIG. 14 is a cross-section view of the parallel mixed power unit in the present invention, indicating a power flow transmitting direction when it is operated under a static charging mode.

6. The static charging mode, as shown in FIG. 14, is applicable to a condition that the parallel mixed power unit 12 is in a motionless state and the storage battery 22 is charged by the internal combustion engine 13. At this time, the brake 24 on the output shaft 20 stops the output shaft 20 from rotating, so that the kinetic energy output by the internal combustion engine 13 is completely supplied to the generator 15 to be converted into electric power for storing.

Figure 15:
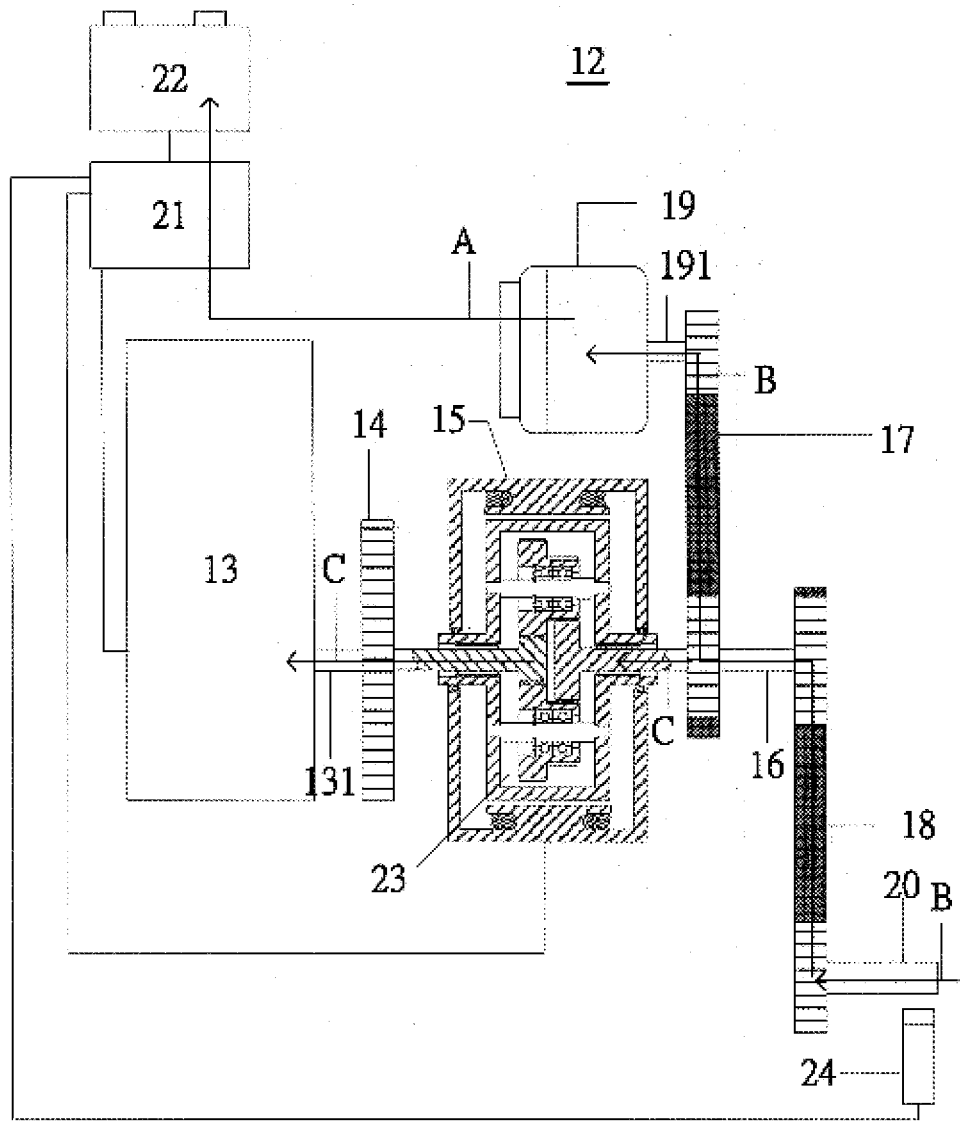
FIG. 15 is a cross-section view of the parallel mixed power unit in the present invention, indicating a power flow transmitting direction when it is operated under a brake-charging mode without starting the internal combustion engine.
Figure 16:
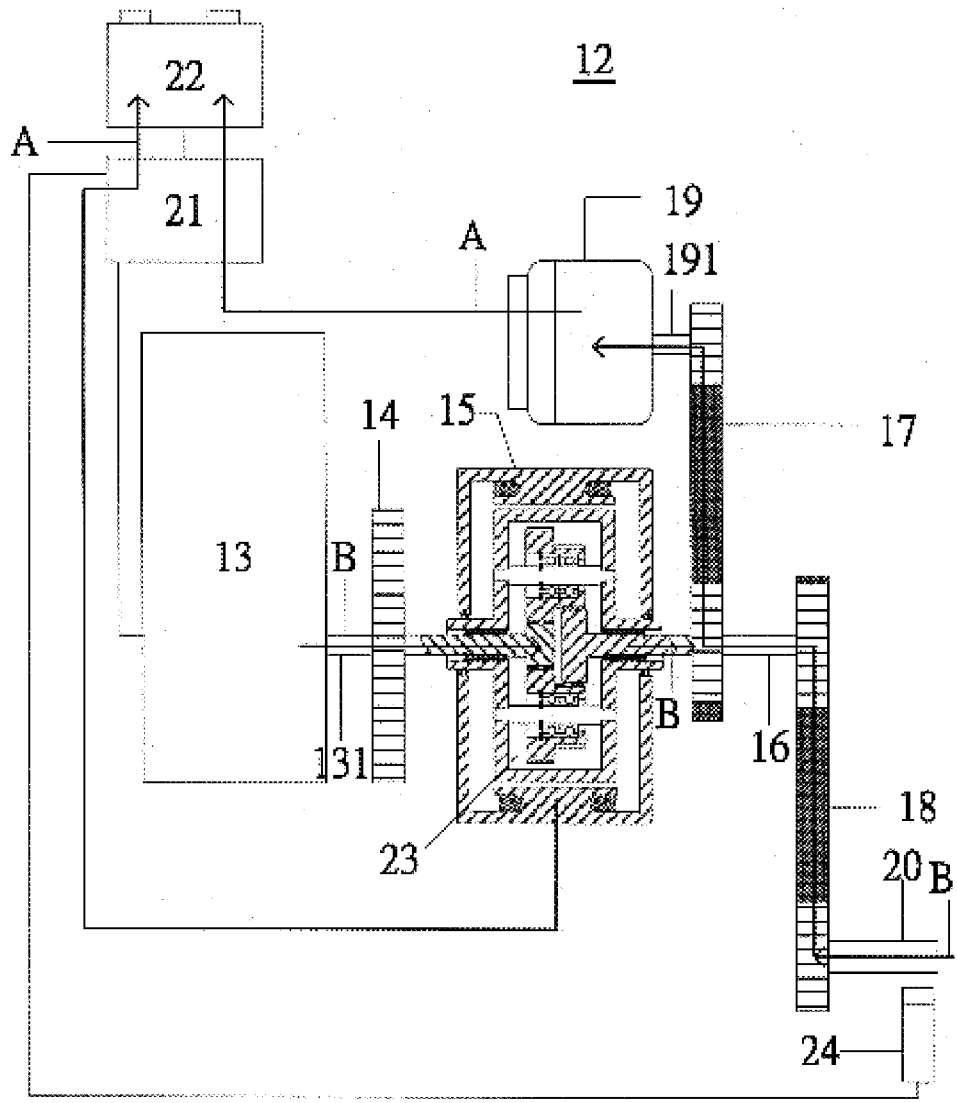
FIG. 16 is a cross-sectional view of the parallel mixed power unit in the present invention, indicating a power flow transmitting direction when it is operated under the brake charging mode after the internal combustion engine is started.

7. The brake and speed-reducing charging mode, as shown in FIG. 15 and 16, is applicable to a condition that when the output shaft 20 needs to reduce speed, the brake 24 is not used and the electron controlling module 21 controls the electric motor 19 to function as a brake to take back the surplus kinetic energy and convert it into electric power to be stored in the storage battery 22. At this time, as shown in FIG. 15, when the internal combustion engine 13 is not started and the output shaft 20 needs to be braked for reducing speed, the electric motor 19 serves as a power-storing device to convert kinetic energy into electric power to be stored. Although the internal combustion engine 13 and the generator 15 may waste a little energy at the moment due to rotating idly, yet the brake 241 installed on the flywheel 14 can prevent the internal combustion engine 13 from rotating idly, making up the first developed parallel mixed power unit 121, as shown in FIG. 6.

Besides, the a 25 can be installed between the outer side of the planetary gear differential device 23 and the rotary transmitting device 17, making up the second developed parallel mixed power unit 122, as shown in FIG. 8. The clutch 25 separates the clutch section 161 from the non-clutch section 162 of the transmission shaft 16 to let kinetic energy impossible to be transmitted to the internal combustion engine 13 and the generator 15 through the clutch section 161 of the trans mission shaft 16 so as to prevent the internal combustion engine 13 and the generator 15 from rotating idly and wasting energy. FIG. 16 shows that after the internal combustion engine 13 is started and when the output shaft 20 needs to reduce speed, the brake 24 is not necessary to be used, but the electric motor 19 and the generator 15 are used as power storing devices to make electric power stored in the storage battery 22.

Figure 17:
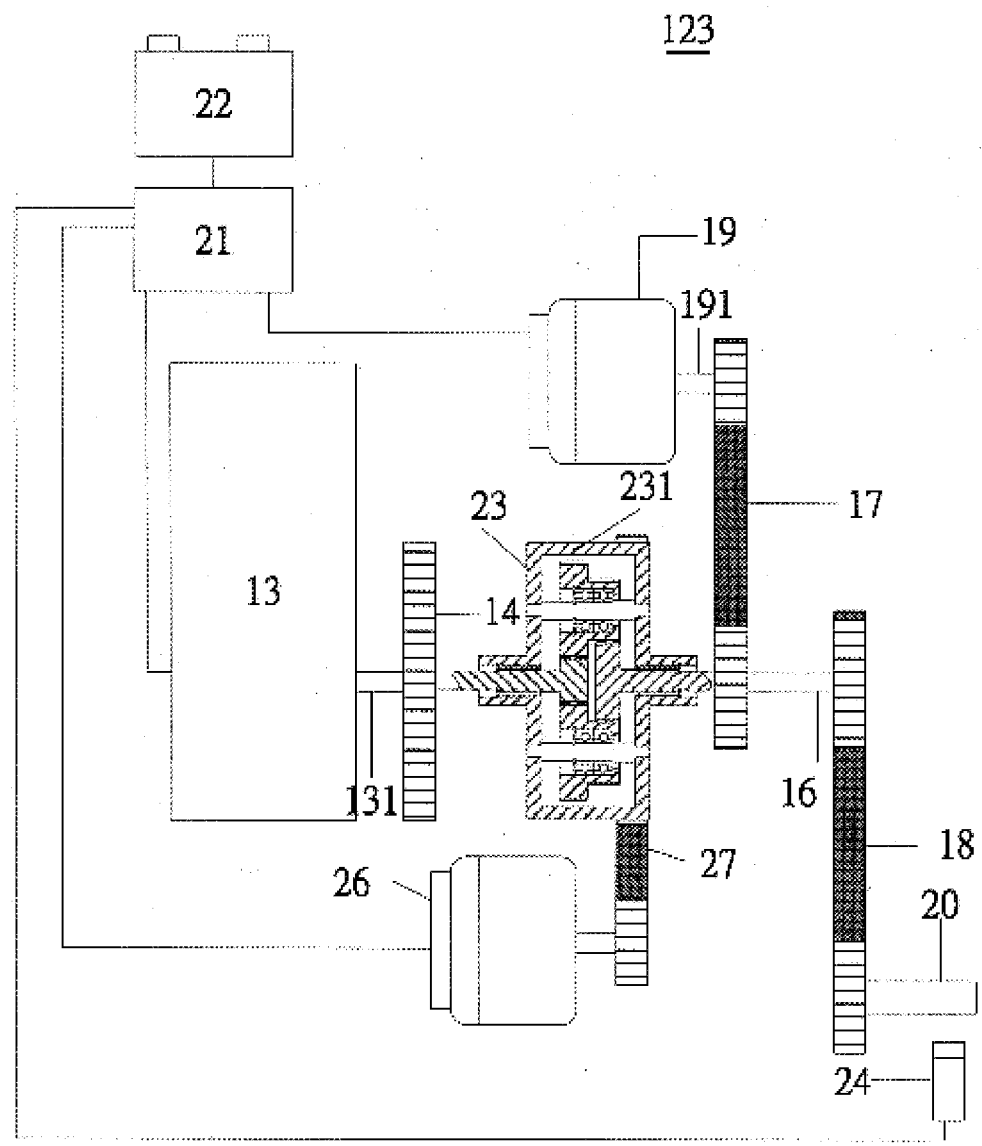
FIG. 17 is a cross-sectional view of a third developed parallel mixed power unit in the present invention.

In addition, in order to facilitate producing, the planetary gear differential device 23 in the rotor 152 of the generator 15 is separated from the generator 15, as shown in FIG. 17, and a commonplace generator 26 is connected with the shell 231 of the planetary gear differential device 23 by a rotary transmitting device 27 made of a gear, a belt or a chain. Therefore the commonplace generator 26 can be employed in this invention, thus making up a third developed parallel nixed power unit 123, which has the same function and operating mode as those of the parallel mixed power unit 12.

Figure 18:
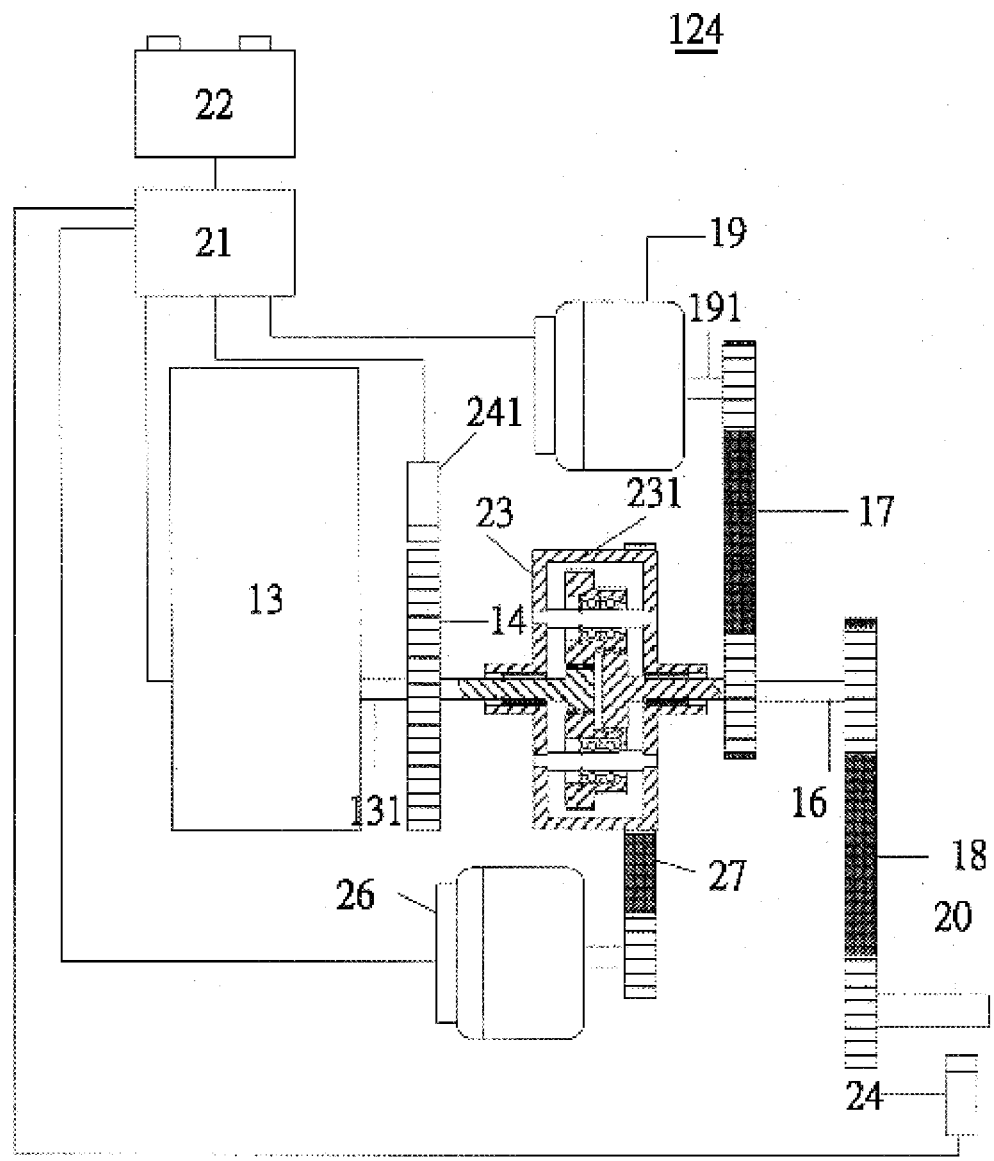
FIG. 18 is a cross-sectional view of a fourth developed parallel mixed power unit in the present invention.
Figure 19:
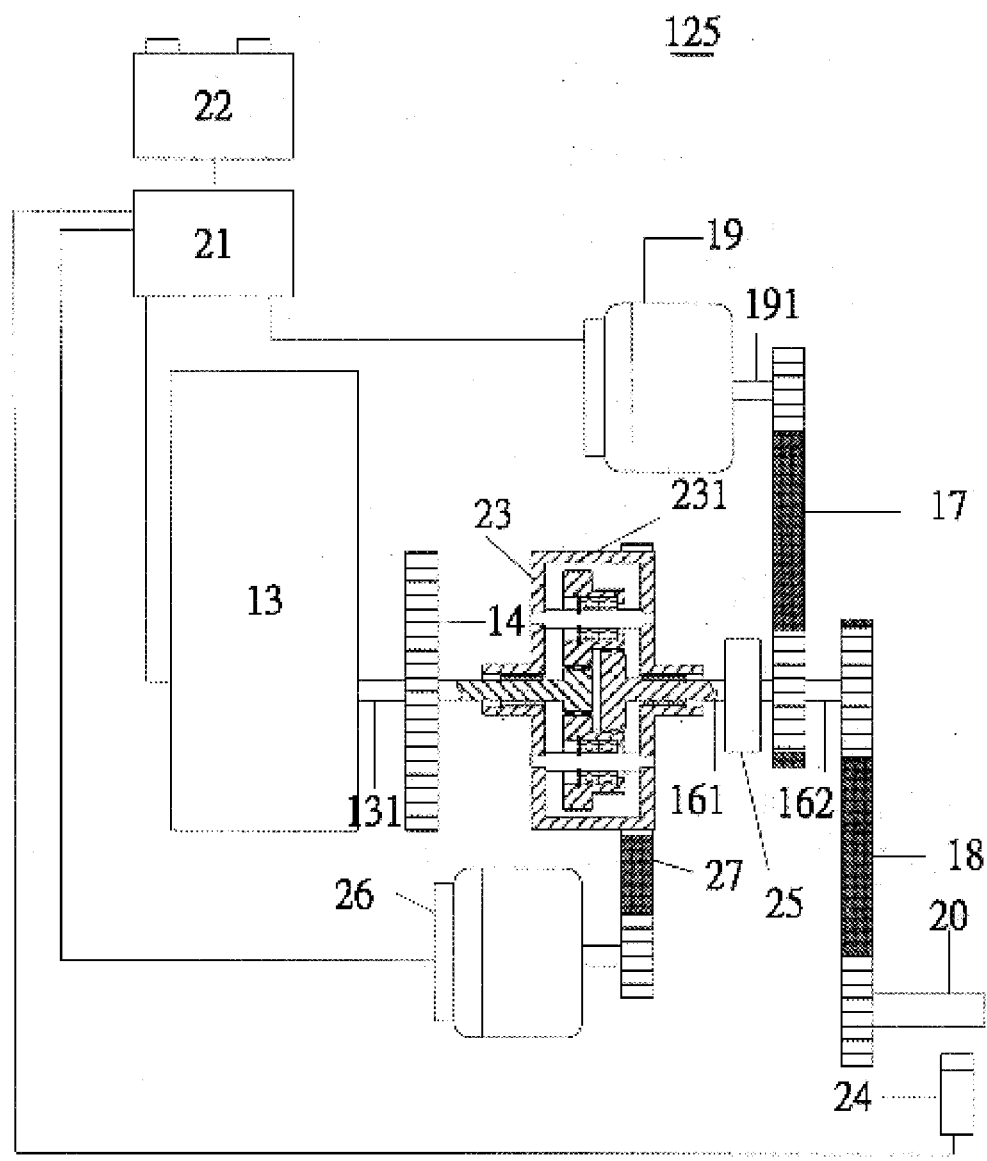
FIG. 19 is a cross-sectional view of a fifth developed parallel mixed power unit in the present invention.

Furthermore, to prevent the internal combustion engine 13 and the generator 26 in the third developed parallel mixed power unit 123 from rotating idly under the completely electrically operating mode, and the brake and speed-reducing charging mode, the brake 241 is installed on the flywheel 14 to form a fourth parallel mixed power unit 124, as shown in FIG. 18, or the clutch is added between the outer side of the planetary gear differential device 23 and the rotary transmitting device 17 to form a fifth developed parallel mixed power unit 125, as shown in FIG. 19.

As can be noted from the above description, this invention is able to improve the defects of wear in the interior and inconvenience in producing of the conventional parallel mixed power unit, having creativity and practicability.

While the preferred embodiment of the invention has been described above, it will be recognized and understood that various modifications may be made therein and the appended claims are intended cover all such modifications that may fall within the spirit and scope of the invention.

I claim:

1. A parallel mixed power unit comprising a storage battery, an electron controlling module, an internal combustion engine, an output shaft of said internal combustion engine, a flywheel fixed on said output shaft, a planetary gear differential device, said planetary gear differential device having a shell able to be actuated to rotate by the rotor of a generator, said planetary gear differential device provided at the inner side with at least one planetary gear unit, said planetary gear unit provided thereon with two planetary gears, said two planetary gears positioned coaxially to rotate together, said two planetary gears assembled on a planetary arm by a bearing, said planetary arm fixed on said shell of said planetary gear differential device, a solar gear meshed with one of said two planetary gears and fixed with the output shaft of said internal combustion engine, another solar gear meshed with the other one of said two planetary gears and fixed with a transmission shaft, said transmission shaft having one end connected with the output shaft of an electric motor by a rotary transmission device, said transmission shaft having the other end connected with the output shaft of a load terminal by another rotary transmission device, said electron controlling module choosing a suitable operating mode and controlling an operating opportune moment of said internal combustion engine, said generator, said electric motor and said storage battery, obtaining the purpose of energy management and rotating speed control.

2. The parallel mixed power unit as claimed in claim 1, wherein a brake is installed on said flywheel.

3. The parallel mixed power unit as claimed in claim 1, wherein a clutch is installed on said transmission shaft between the outer side of said planetary gear differential device and said rotary transmission device of said electric motor to divide said transmission shaft into a clutch section and a non-clutch section.

4. The parallel mixed power unit as claimed in claim 1, wherein said planetary gear differential device is directly provided at the inner side of said rotor of said generator.

5. The parallel mixed power unit as claimed in claim 1, wherein said planetary gear differential device is provided separately from said generator, and said rotor of said generator is connected with said shell of said planetary gear differential device by said rotary transmission device.

6. The parallel mixed power unit as claimed in claim 1, wherein said electron controlling module controls a completely electrically operating mode, and under this operating mode said electric motor serves as a power source to output kinetic energy to balance an external load.

7. The parallel mixed power unit as claimed in claim 1, wherein said electron controlling module controls an internal combustion engine starting mode under which said internal combustion engine is started by said electric motor and said generator.

8. The parallel mixed power unit as claim in claim 1, wherein said electron controlling module controls a double charging mode under which said electric motor serves as a power storing device, and part of the kinetic energy output by said internal combustion engine deals with an external load and the rest of said kinetic energy is supplied to said generator and said electric motor to generate electricity.

9. The parallel mixed power unit as claimed in claim 1, wherein said electron controlling module controls a single charging mode and under which said electric motor serves as another power source and at this time part of the kinetic energy output by said internal combustion engine is supplied for said generator to be converted into electric power for charging said storage battery, and the rest of said kinetic energy combines with the kinetic energy output by said electric motor to deal with an external load together.

10. The parallel mixed power unit as claimed in claim 1, wherein said electron controlling module controls a no-storage mode under which said electric motor serves as a power source, and at this time part of the kinetic energy output by said internal combustion engine is supplied for said generator to be converted into electric power to be supplied for said electric motor, which then converts said electric power into kinetic energy to combine with part of the kinetic energy output by said internal combustion engine to deal with said external load together.

11. The parallel mixed power unit as claimed in claim 1, wherein said electron controlling module controls a static charging mode under which the kinetic energy output by said internal combustion engine is completely supplied to said generator to be converted into electric power for storing when said output shaft of a load terminal keeps immovable.

12. The parallel mixed power unit as claimed in claim 1, wherein said electron controlling module controls a brake and speed-reducing charging mode, and under this operating mode, when said output shaft of said load terminal needs to reduce speed, it is not necessary to use said brake, but use said electron controlling module to control said electric motor to serve as a brake to take back surplus kinetic energy and convert it into electric power to be stored in said storage battery.

13. The parallel mixed power unit as claimed in claim 1, wherein said rotary transmission device is a gear.

14. The parallel mixed power unit as claimed in claim 1, wherein said rotary transmission device is a belt.

15. The parallel mixed power unit as claimed in claim 1, wherein said rotary transmission device is a chain.

* * * * *